Oct. 12, 1965 J. W. JOHNSON, JR., ETAL 3,211,421
ROTARY PLUG VALVE AND SEAT THEREFOR
Filed Sept. 18, 1961 2 Sheets-Sheet 1

James W. Johnson, Jr.
John L. Yopp
INVENTORS

BY Russell E. Schloff
ATTORNEY

Oct. 12, 1965  J. W. JOHNSON, JR., ETAL  3,211,421
ROTARY PLUG VALVE AND SEAT THEREFOR
Filed Sept. 18, 1961  2 Sheets-Sheet 2
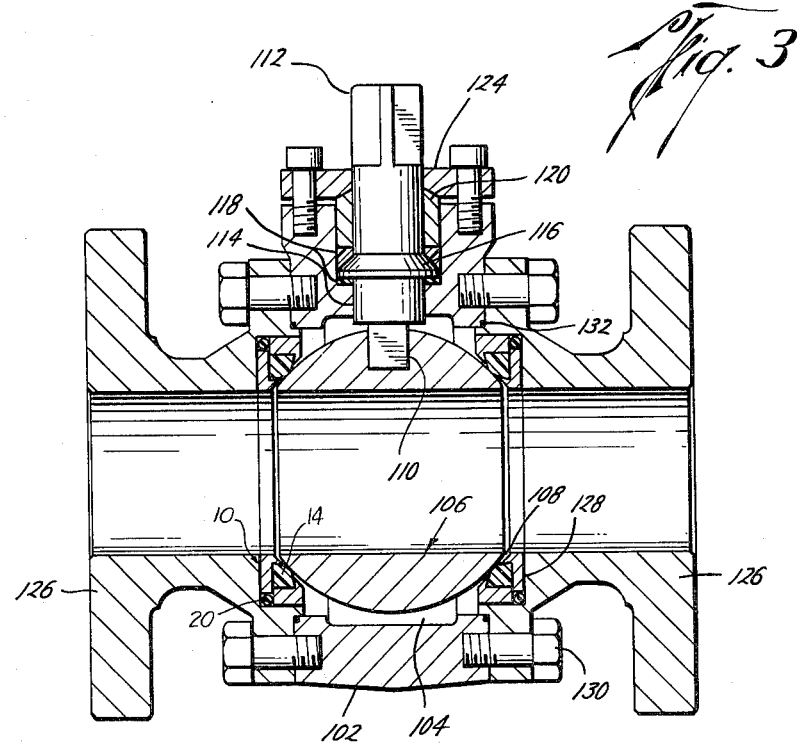
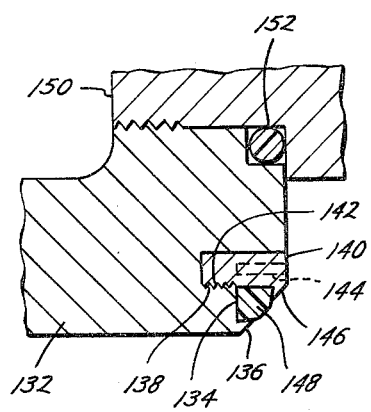
James W. Johnson, Jr.
John L. Yopp
INVENTORS
BY Russell E. Schloff
ATTORNEY

United States Patent Office 3,211,421
Patented Oct. 12, 1965

3,211,421
ROTARY PLUG VALVE AND SEAT THEREFOR
James W. Johnson, Jr., and John L. Yopp, both of Houston, Tex., assignors to ACF Industries, Incorporated, New York, N.Y., a corporation of New Jersey
Filed Sept. 18, 1961, Ser. No. 138,930
14 Claims. (Cl. 251—315)

This invention relates to rotatable plug valves, more particularly to a seat for incorporation in a spherical plug valve commonly referred to as a "ball valve."

Rotatable plug valves and ball valves are quite old in the art. They are generally comprised of a valve body having a central valve chamber. A rotatable valve member is positioned in the valve chamber and a seat member is positioned between the valve member and at least one end of the valve chamber. The valve member has an internal passage which in the open position of the valve registers with the inlet and outlet port to form the run of the valve. A stem projects through the body providing means to rotate the valve member between the open and closed positions. Originally, seat members for ball valves were formed of various rubberlike materials. However, with the improvement of inert plastics, more particularly ethylene polymers containing fluorine, the trend has been toward the utilization of such plastics. It is particularly to the development of a novel seat to which the present invention is directed.

Most of the seals established in ball valves have been of the interference or compression type, that is, the seat is compressed between the valve member and end wall of the body to build up an internal force in the seat member which causes the seat member to maintain intimate contact with the spherical surface of the valve member and the end wall of the body thereby establishing a seal between the body and the seat member, and a seal between the valve member and the seat member. The compression provides not only the initial seal, but also the seal used for the normal function of the valve. One difficulty with such type of seat is that as the valve rotates between positions an unsupported portion of the upstream seat is exposed to line pressure which tends to force the unsupported portion of the seat into the run of the valve where it can be cut by the trailing edge of the passage. In one aspect, the seat of the present invention eliminates the cutting of the seat.

One other type of seat is the pressure-actuated seat, that is, a seat which is energized by line pressure. Again, operation of the valve may damage the seat and it is to provide a remedy for this defect that the seat of the present invention is designed. A popular type of ball valve is the top entry, that is, one having an open-ended valve chamber closed by a bonnet which permits repair of the valve while it is installed in the line. Since the inert plastics are as a class rather hard, assembly of this type valve has been difficult and tolerances extremely rigid. With the seat of the present invention assembly is facilitated.

The present invention overcomes the above-mentioned shortcomings of ball valves. It relates to a seat for a valve which is comprised of a ring of resilient material having a generally triangular cross-section which is confined by a pocket formed by the assembly of an annular ring and a circular ring. Both rings have flanges which restrain and confine the resilient mass which forms the seal with the valve member. The outer corner of the circular ring is provided with a tapered notch in which is positioned an O-ring of resilient material which, in effect, forms a seal between the body and the seat. The seat member can be used in either an end entry valve or in a top entry valve. If it is used in a top entry valve, the seat member is placed in a detachable seat pocket which has a seal against the end wall of the valve chamber. In either case, the tapered notch provided with the O-ring of resilient material gives a wedging action initiating the seal and making the assembled unit a floating seat which will respond to pressure in the valve. The seat may be disassembled for a complete cleaning of all members and is completely reusable as no damage occurs during assembly or disassembly. The seat can be economically manufactured inasmuch as it can be machined from extruded tubing and is so constructed that the valve can be fully trimmed with resilient material which allows the valve to be used for a greater number of services.

It is an object of the present invention to provide a seat for a ball valve which can be used for either top entry or end entry construction.

It is an other object to provide a seat of resilient material which can be used either as a compression type or floating type seat.

It is a further object to provide a seat for a ball valve which can be completely disassembled for cleaning.

It is a further object to provide a seat of resilient material that is completely restrained and confined to prevent cutting out during operation.

It is a further object to provide a seat for a top entry ball valve which can be fully trimmed with resilient material.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purpose of illustration and description and are shown in the accompanying drawings, forming a part of the specification, wherein;

FIG. 3 is a cross-sectional view of an end entry ball valve incorporating a seat of the present invention.

FIG. 4 is a fragmentary cross-sectional view showing a modified form of the seat of the present invention.

Figure 1:
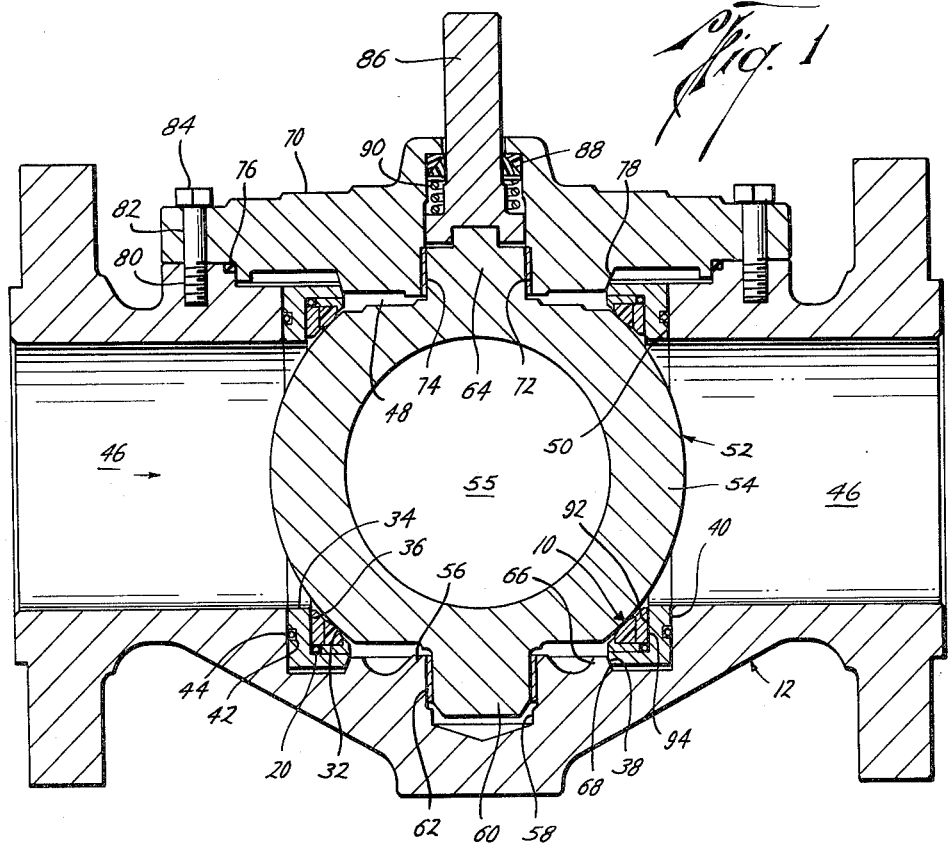
FIG. 1 is a cross-sectional view of a top entry ball valve incorporating the seat of the present invention.
Figure 2:
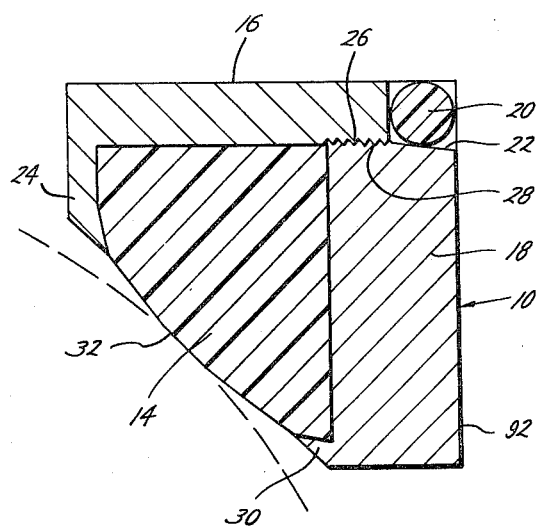
FIG. 2 is an enlarged cross-sectional view of the seat.

Referring now to the drawings, FIG. 1 shows the incorporation of novel seat 10 in a top entry ball valve 12. The seat 10 is pressure-actuated (or floating seat) and therefore forms an upstream seal. The seat 10 can be used in an end entry ball valve as is shown in FIG. 3 again being pressure actuated or floating; or if desired, the seat can be used as a compression seal or a straight interference seat as is shown in FIG. 4.

Basically, the seat 10 is comprised of a ring of resilient material 14 having a generally right triangular cross-section. The right angle of the ring 14 is positioned in the apex of an L-shaped assembly formed by the assembly of an angular metal ring 16 with a circular metal ring 18. A pair of flanges co-operate with the hypotenuse of the ring 14 to confine and retain it in the L-shaped assembly. When the seat 10 is used as a pressure-actuated seat, an O-ring 20 formed of resilient material is positioned in a tapered notch 22 in the axially outer corner of the seat 10.

The mass 14 is formed of a material having the following qualifications: impervious to inner leakage; flexible enough to conform to the spherical surface of the valve member; resistant to fluids likely to be carried by the valve; sufficient internal strength to resist excessive distortion and to resist being blown out during operation; low coefficient of friction to permit easy operation; stable characteristics over a wide temperature range; a fair degree of resiliency; easy to handle and simple to use; and economically available. While these requirements may at first appear rigorous, it has been found that one of the fluorocarbon plastics, i.e., polytetrafluoroethylene sold by Du Pont under the trade-mark "Teflon," satisfactorily fulfills the above requirements and provides a usable material for the mass 14. Depending upon the size, lading to be carried, and pressure rating, the mass 14 may be formed of other materials including other fluorocarbon plastics such as polychlorofluoroethylene sold under the trade-mark "Kel-F," nylon, other plastics, hard rubber, etc. The O-ring 20 is formed of similar material. By utilizing the seat 10 of the present invention, the valve can be fully trimed in a resilient material such as Teflon.

The annular metal ring 16 has a radially inwardly extending flange 24 at one end and a female threaded portion 26 on the inner circumferential surface of the other end. The circular metal ring has a male threaded portion 28 extending approximately one-half the axial length of the outer circumferential surface. The male threaded portion 28 is engageable with the female threaded portion 26 of the annular ring 16 to form an L-shaped assembly. The remainder of the axial length of the outer circumferential surface slants angularly inward to form the previously mentioned tapered notch 22 which is located at the axial outer end of the seat assembly 10. The inner circumferential edge of the circular ring 18 is provided with an axially inwardly extending flange 30. The two flanges 24 and 30 co-operate to retain the mass 14 in the assembly. The ends of the flanges 24 and 30 are tapered forming generally a 45° angle with inner circumferential surface of the circular ring 10 to provide clearance for a spherical valve member. The face 32 of the mass 14 which will oppose the valve member extends slightly above the plane formed by the tapered surfaces of the two flanges 24 and 30.

The seat 10 is so designed that it may be completely disassembled for a complete LOX cleaning or for steam cleaning if desired. The seats are reusable and are so designed that no damage will occur during assembly or diassembly. The mass of resilient material is so designed that it can be machined from extruded stock making it economical to manufacture. The seat is so designed as to allow a valve to be fully trimmed with resilient material and also allows a greater latitude in machining tolerances which again makes a valve utilizing the seat economical to manufacture.

If the seat 10 is to be used in the top entry valve 12 such as shown in FIG. 1, the seat 10 is positioned into a detachable seat pocket 34. This pocket consists of a metal ring having a generally L-shaped cross-section forming a right angled inner pocket 36 into which the seat 10 fits. The axial inner face 38 of the ring is tapered, the purpose of which will be explained subsequently. The axial outer face 40 generally is flat and is provided with an annular groove 42 into which is positioned an O-ring 44.

The top entry valve 10 has a valve body having two axially aligned fluid passages 46—46 forming inlet and outlet ports. An open-ended valve chamber 48 is interposed between the passages 46—46. The chamber 48 is defined in part by end walls 50—50 which surround the passages 46. While as previously mentioned passages 46—46 are shown axially aligned, these passages may be angularly disposed if desired. Located in the valve chamber 48 is a rotatable valve member 52 having a spherical sealing surface 54 which contacts the surface 32 of the seat member 10 to form the seal between the valve member and seat. The valve member has a passage 55 which in the open position aligns with the passages 46—46 to form the run of the valve. As shown, the bottom of the chamber 48 is provided with a boss 56 having a bore 58. The valve member has a bottom stem 60 which is trunnioned in the bore 58. If desired, a bushing 62 may be positioned between the stem 60 and the bore 58. The valve member also has an upper stem 64. Located in the chamber 48 is a pad 66 having a tapered surface 68 which matches the tapered surface 38 on the detachable seat pocket 34. To assemble the valve, the seat members 10 are placed in their detachable seat pockets 34 and this assembly is positioned about the ball. The valve member and seat pocket combination is then introduced into the open-ended valve chamber 48. When the lower edge of the seat pockets 34 engage the tapered surface 68 of the pads 66, a bonnet 70 is installed. The bonnet 70 closes the top of the valve chamber and is provided with a bore 72 which will trunnion the upper stem 64 of the valve member 52. Again a bushing 74 may be placed between the stem 64 and bore 72. A gasket 76 located between the bonnet 70 and the top of the housing prevents any leakage about the bonnet. The bonnet 70 is provided with a tapered surface 78 which matches the tapered surface 38 of the seat pocket. To install the bonnet, the top of the body is provided with a number of threaded apertures 80 and the bonnet is provided with matching apertures 82. Into these apertures are threaded cap screws 84. As the bonnet is tightened, a wedging action forces the seat pockets 34 against the end walls 50 of the chamber 48. This initiates an interference seal with the resilient O-ring 44 and the machined surface of the in walls 50. There is also formed a slight interference seal between the surface 32 of the resilient mass 14 and the spherical surface 54 of the valve member 52. There is no need for further support of the seat pockets 34 due to the piston action of the seat 10 within the seat pockets 34 during operation of the valve. The terminal end of the upper stem 64 is provided with a portion which mates with the operating stem 86 which extends outwardly through an aperture in the bonnet. A pressure-actuated bonnet seal 88 is positioned between the stem 86 and the aperture in the bonnet and may be loaded by a spring 90.

The operation of the pressure-actuated seat 10 is as follows. With the valve in the closed position, as shown in FIG. 1, upstream pressure (shown by the arrow in FIG. 1) will initially be retained by the interference seal between the surface 32 of the mass 14 and the spherical surface 54 of the valve member 52 and will flow therefore between the axial outer face 92 of the circular ring 18 and the axial inner face 94 of the detachable seat pocket 34 and act upon the O-ring 20. Inasmuch as the O-ring 20 is in a tapered notch, the line pressure will cause the O-ring to move up in its notch in a wedging action initiating moving the seat assembly 10 and particularly the mass 14 into more intimate contact with the spherical surface 54 of the valve member 52. The greater the pressure the more the seat 10 will be moved to contact with the spherical surface 54 of the valve member 52. As the valve member 52 is opened, the flanges 24 and 30 will co-operate to restrain the mass 14 during the time that a portion of the mass 14 is unsupported during the traverse of the passage 55 and will confine the mass 14 and will prevent it from being blown downstream or being bulged out where it can be cut off by the trailing end of the passage 55 of the valve member 52.

As can be seen, the valve is relatively easy to assemble and it can be fully trimmed in resilient material. Also, once assembled the seat member 10 is pressure actuated and will provide the necesasry contact depending upon the line pressure. The valve may be completely disassembled for cleaning and the seats removed, cleaned and replaced without any damage to the seats.

FIG. 3 shows the seat 10 utilized in an end entry valve 100. The seat 10 is the same as previously described and the same reference characters will be used in the description of the seat as incorporated in the end entry valve. The end entry valve 100 is comprised of a body 102 having a through passage 104 in which is positioned a spherical valve member 106 having spherical sealing surfaces 108. The valve member has a slot 110 into which is positioned a stem 112. The stem 112 extends through an opening 114 in the body. The stem is provided with a shoulder 116 on each side of which is positioned a sealing ring 118. A compression ring 120 is located axially outward of the sealing rings 118 and is retained in position by a bonnet cap 124 which is secured to the top of the body. The seat members 10 are positioned in end members 126—126 which are provided with machined pockets 128 to receive the seats 10. The end members 126 are then bolted onto the body by bolts 130. An O-ring 132 is positioned between the body and end members 126 to prevent any leakage between the connection between the body and end members. When contacting the ends of the body 102, the end members 126 will provide a slight interference between the surface 32 of the mass 14 and spherical surface of the valve member 106. However, the seat is again pressure acting and will operate in the same manner as previously described for the top entry valve 10.

If it is desired that the seat be an interference seat instead of a floating seat, the construction shown in FIG. 4 can be utilized. As can be seen in this construction, the end member 132 has a machined pocket 134 which has an axially inwardly extending flange member 136. The pocket also has a threaded portion 138 which receives a seat retaining ring 140 having a female threaded portion 142 on its axial outer end which engages with the male threaded portion 138 in the seat pocket. The seat retainer ring may be provided with spanner holes 144 to facilitate insertion. The seat retainer ring 140 has a radially inwardly extending flange 146 which co-operates with the flange 136 to retain the mass of resilient material 148 which is similar to the mass 14 of the seat 10. In this case, the end member 132 is threaded into the body 150 and an O-ring 152 is positioned between the body 150 and end member 132 to establish a seal. In such construction, the mass 148 acts as an interference seat and the amount of sealing force will depend upon the amount of compression built up in the assembly of the valve. However, again the seat 148 will be retained by the flanges 136 and 146 during operation and will not be blown out where it could be cut by the trailing edge of the passage in the valve member. These flanges will co-operate to confine the seat and will prevent its being blown out during operation of the valve. Again, the seat may be removed by cleaning without damage to the seat.

As can be seen from the foregoing, the present invention provides a seat of resilient material which is completely confined and restrained. It can be utilized as a pressure-acting seat in a top entry or end entry valve. It is so constructed that the valves are easy to manufacture and assemble. Also, the seat can be used as a compression type seat. In either event, the seat is completely confined and will not protrude into the run of the valve where it could be sheared by the passage in the valve member.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

What we claim is:

1. A seat for a rotary plug valve comprising an annular metal ring having a radially inwardly extending flange at one end and a female threaded portion on the inner circumferential surface of the other end, a circular metal ring, a male threaded portion extending approximately one-half the axial length of the outer circumferential surface, said male threaded portion engageable with the female threads of the annular ring to form a generally L-shaped assembly, the remainder of the axial length of the outer circumferential surface slanting angularly inward, the inner circumferential edge of the circular ring being provided with an axially inwardly extending flange, a mass of resilient material having a generally triangular cross-section positioned between the annular ring and the circular ring, the flange of the annular ring and the flange of the circular ring co-operating to retain said mass of resilient material, the two flanges forming generally a 45° angle to the inner circumferential surface of the circular ring, the face of the resilient mass restrained by the flanges extending above the plane formed by the flanges.

2. A seat for a rotary plug valve comprising an annular metal ring having a radially inwardly extending flange at one end and a female threaded portion on the inner circumferential surface of the other end, a circular metal ring, a male threaded portion extending approximately one-half the axial length of the outer circumferential surface, said male threaded portion engageable with the female threads of the annular ring, the remainder of the axial length of the outer circumferential surface slanting angularly inward, the inner circumferential edge of the circular ring being provided with an axially inwardly extending flange, a mass of resilient material having a generally triangular cross-section positioned between the annular ring and the circular ring, the flange of the annular ring and the flange of the circular ring co-operating to retain said mass of resilient material.

3. A seat for a rotary plug valve comprising an annular ring having a radially inwardly extending flange at one end and a female threaded portion on the inner circumferential surface of the other end, a circular ring, a male threaded portion extending approximately one-half the axial length of the outer circumferential surface, said male threaded portion engageable with the female threads of the annular ring to form a generally L-shaped assembly, the remainder of the axial length of the outer circumferential edge slanting angularly inward, the inner circumferential edge of the circular ring being provided with an axially inwardly extending flange, a mass of resilient material having a generally triangular cross-section positioned between the annular ring and the circular ring, the flange of the annular ring and the flange of the circular ring co-operating to retain said mass of resilient material, the face of the mass retained by the flanges extending above a plane formed by the flanges.

4. A seat for a rotary plug valve comprising an annular ring having a radially inwardly extending flange at one end, a circular ring, means to detachably secure the annular ring and circular ring together, approximately one-half of the axial length of the outer circumferential edge of said circular ring slanting angularly inward to form a tapered notch with the annular ring, the inner circumferential edge of the circular ring being provided with an axially inwardly extending flange, a mass of resilient material having a generally triangular cross-section positioned between the annular ring and the circular ring, the flange of the annular ring and the flange of the circular ring co-operating to retain said mass of resilient material, the face of the mass of resilient material restrained by the flanges extending above a plane formed by the flanges.

5. A seat for a rotary plug valve comprising an annular ring and a circular ring detachably interconnected one to the other to form a generally L-shaped sealing member retaining assembly, the circular ring and the annular ring each forming a leg of said L-shaped assembly, a sealing member composed of a mass of resilient material having a generally triangular cross-section positioned between the legs of the L-shaped assembly, the annular ring and circular ring having flanges which co-operate with one face of the triangular mass to confine and retain said mass, the face of the mass retained by the flanges extending above a plane formed by the flanges.

6. The seat described in claim 5 characterized in that the resilient material is polytetrafluoroethylene.

7. A top entry ball valve comprising: a valve body having two axially aligned fluid passages forming inlet and outlet ports and an open-ended valve chamber interposed between said passages, said chamber defined in part by end walls surrounding said passages, a rotatable spherical valve member having an internal passage which in the open position registers with the inlet and outlet ports, trunnioned in said chamber a pair of detachable seat pockets, one positioned between the valve member and each end wall, each seat pocket formed of an annular ring having an L-shaped cross-section, the axial outer side of the pocket having a pair of seat members one positioned in each detachable seat pocket, said seat members comprising: an annular metal ring having a radially inwardly extending flange at the end opposing the valve member and a female threaded portion on the inner circumferential surface at the end opposing the seat pocket, a circular metal ring having a male threaded portion extending approximately one-half the axial length of its outer circumferential surface engageable with the female threads of the annular ring, the remainder of the axial length of the outer circumferential edge slanting angularly inward forming a tapered notch, the inner circumferential edge of the circular ring provided with an axially inwardly extending flange, a mass of resilient material having a generally triangular cross-section positioned between the annular ring and circular ring with the flanges of the annular ring and circular ring co-operating to retain said mass, an O-ring of resilient material positioned in the tapered notch of the circular ring, a bonnet closing the open-ended chamber, the chamber and bonnet having tapered abutments and the inner face of the seat pocket having a similarly tapered surface whereby on assembly the seat pocket is forced into intimate contact with the end wall of the chamber.

8. A top entry valve comprising: a valve body having fluid passages forming inlet and outlet ports and an open ended valve chamber interposed between said passages, said chamber defined in part by end walls surrounding said passages; a rotatable valve member having an internal passage which in the open position registers with the inlet and outlet ports; a pair of detachable seat pockets, one positioned between the valve member and each end wall, a pair of seat members one positioned in each seat pocket, said seat members comprising: an annular ring having a radially inwardly extending flange at the end opposing the valve member and a female threaded portion on the inner circumferential surface at the end opposing the seat pocket, a circular ring having a male threaded portion extending approximately one-half the axial length of its outer circumferential surface engageable with the female threads of the annular ring, the remainder of the axial length of the outer circumferential edge slanting angularly inward forming a tapered notch, the inner circumferential edge of the circular ring provided with an axially inwardly extending flange, a mass of resilient material having a generally triangular cross-section positioned between the annular ring and circular ring with the flanges of the annular ring and circular ring co-operating to retain said mass, an O-ring of resilient material positioned in the tapered notch of the circular ring; a bonnet closing the open-ended chamber, means in the chamber and bonnet co-operating with the seat pockets to sealingly engage each seat pocket with its respective end wall.

9. A top entry valve comprising: a valve body having fluid passages forming inlet and outlet ports and an open-ended valve chamber interposed between said passages, said chamber defined in part by end walls surrouding said passages; a rotatable valve member having an internal passage which in the open position registers with the inlet and outlet ports; a pair of detachable seat pockets, one positioned between the valve member and each end wall, a pair of seat members one positioned in each seat pocket, said seat members comprising: an annular ring and a circular ring securable together to form an L-shaped assembly, a mass of resilient material having a generally triangular cross-section positioned between the legs of the L-shaped assembly, the annular ring and circular ring having flanges which co-operate with one face of the triangular mass to confine and retain said mass, a tapered notch in the axial outer edge of the L-shaped assembly, an O-ring of resilient material positioned in the tapered notch; a bonnet closing the open-ended chamber, means in the chamber and bonnet co-operating with the seat pockets to sealingly engage each seat pocket with its respective end wall.

10. A ball valve comprising: a valve body having a through passage forming inlet and outlet ports; a rotatable valve member having a spherical sealing surface and an internal passage which in the open position registers with the inlet and outlet ports; a pair of end members insertable into the ends of the through passage in the body and securable thereto; a pair of seat members, one positioned between the valve member and each end member, said seat members comprising: an annular ring having a radially inwardly extending flange at the end opposing the valve member and a female threaded portion on the inner circumferential surface at the end opposing the end wall, a circular ring having a male threaded portion extending approximately one-half the axial length of its outer circumferential surface engageable with the female threads of the annular ring, the remainder of the axial length of the outer circumferential edge slanting angularly inward forming a tapered notch, the inner circumferential edge of the circular ring provided with an axially inwardly extending flange, a mass of resilient material having a generally triangular cross-section positioned between the annular ring and circular ring with the flanges of the annular ring and circurlar ring co-operating to retain said mass, said mass contacting the spherical surface of the valve member in sealing contact, an O-ring of resilient material positioned in the tapered notch of the circular ring.

11. A ball valve comprising: a valve body having a through passage forming inlet and outlet ports; a rotatable valve member having a spherical sealing surface and an internal passage which in the open position registers with the inlet and outlet ports; a pair of end members insertable into the ends of the through passage in the body and securable thereto; a pair of seat members, one positioned between the valve member and each end member, said seat members comprising: an annular ring having a radially inwardly extending flange at the end opposing the valve member, a circular ring having an axially inwardly extending flange at the inner end of the axial inner circumferential surface, a tapered notch formed at the juncture of the annular ring with the circular ring, means securing the annular ring and circular ring together to form an L-shaped assembly, a mass of resilient material having a generally triangular cross-section positioned between the annular ring and circular ring with the flanges of the annular ring and circular ring co-operating to retain said mass, said mass contacting the spherical surface of the valve member in sealing contact, an O-ring of resilient material positioned in the tapered notch of the circular ring.

12. The valve described in claim 11 characterized in that the resilient material is tetrafluoroethylene.

13. A valve comprising: a valve body having inlet and outlet ports and a valve chamber interposed between said ports, said chamber defined in part by end walls surrounding said ports; a rotatable valve member having an internal passage which in the open position registers with the inlet and outlet ports; a pair of seat members, one positioned between the valve member and each end wall, said seat members comprising: an annular ring having a radially inwardly extending flange at the end opposing the valve member and a female threaded portion on the inner circumferential surface at the end opposing the end wall, a circular ring having a male threaded portion extending approximately one-half the axial length of its outer circumferential surface engageable with the female threads of the annular ring, the remainder of the axial length of the outer circumferential edge slanting angularly inward forming a tapered notch, the inner circumferential edge of the circular ring provided with an axially inwardly extending flange, a mass of resilient material having a generally triangular cross-section positioned between the annular ring and circular ring with the flanges of the annular ring and circular ring co-operating to retain said mass, said mass contacting the surface of the valve member in sealing contact, an O-ring of resilient material positioned in the tapered notch of the circular ring.

14. A valve comprising: a valve body having inlet and outlet ports and a valve chamber interposed between said ports, said chamber defined in part by end walls surrounding said ports; a rotatable valve member having an internal passage which in the open position registers with the inlet and outlet ports; a pair of seat members, one positioned between the valve member and each end wall, said seat members comprising: an annular ring having a radially inwardly extending flange at the end opposing the valve member, a circular ring having its inner circumferential edge provided with an axially inwardly extending flange, means securing the annular ring and circular ring together to form an L-shaped assembly, said circular ring and said annular ring cooperating to define a tapered notch, a mass of resilient material having a generally triangular cross-section positioned between the annular ring and circular ring with the flanges of the annular ring and circular ring co-operating to retain said mass, said mass contacting the surface of the valve member in sealing contact, an O-ring of resilient material positioned in the tapered notch of the circular ring.

References Cited by the Examiner
UNITED STATES PATENTS

| 2,529,412 | 11/50 | Parker | 251—174 |
| 2,845,247 | 7/58 | Housekeeper | 251—317 XR |
| 2,963,262 | 12/60 | Shafer | 251—172 |
| 3,037,738 | 6/62 | Jackson | 251—172 |
| 3,096,966 | 7/63 | McFarland | 251—315 XR |

ISADOR WEIL, *Primary Examiner.*